(12) United States Patent
Ryon et al.

(10) Patent No.: US 12,497,922 B1
(45) Date of Patent: Dec. 16, 2025

(54) FUEL PREHEATING FOR FUEL INJECTION (71) Applicant: Collins Engine Nozzles, Inc., Des Moines, IA (US)

(72) Inventors: Jason Ryon, Carlisle, IA (US); Philip Buelow, West Des Moines, IA (US); Brandon Williams, Johnston, IA (US); Andy Tibbs, Earlham, IA (US); Jared Richards, Mingo, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 18/823,323

(22) Filed: Sep. 3, 2024

(51) Int. Cl.
| | |
|---|---|
| *F02C 7/224* | (2006.01) |
| *F02C 7/264* | (2006.01) |
| *F02M 31/125* | (2006.01) |
| *F02M 53/06* | (2006.01) |
| *F02C 9/28* | (2006.01) |

(52) U.S. Cl.
CPC .............. *F02C 7/224* (2013.01); *F02C 7/264* (2013.01); *F02M 31/125* (2013.01); *F02M 53/06* (2013.01); *F02C 9/28* (2013.01)

(58) Field of Classification Search
CPC .. F02C 7/224; F02C 7/26; F02C 7/262; F02C 7/264; F02C 7/266; F02M 31/12; F02M 31/125; F02M 31/135; F02M 53/06; F23R 3/28; F23R 3/30; F23R 3/343
See application file for complete search history.

(56) References Cited

U.S. PATENT DOCUMENTS

| | | | | |
|---|---|---|---|---|
| 1,757,855 | A * | 5/1930 | Chilowsky | F02M 21/00 48/213 |
| 3,707,074 | A * | 12/1972 | Meyer | F02C 7/224 60/39.821 |
| 3,957,024 | A * | 5/1976 | Mills | F02C 7/224 123/549 |
| 4,047,880 | A * | 9/1977 | Caldarelli | F02K 9/95 431/208 |
| 4,359,861 | A * | 11/1982 | Citelli | F02C 7/224 60/39.15 |
| 5,443,053 | A * | 8/1995 | Johnson | F02M 31/16 123/557 |
| 5,636,511 | A * | 6/1997 | Pfefferle | F23C 13/00 60/39.822 |
| 5,720,261 | A | 2/1998 | Sturman et al. | |
| 6,756,140 | B1 * | 6/2004 | McAlister | F02M 63/0007 429/422 |
| 6,913,004 | B2 | 7/2005 | Pellizzari et al. | |
| 8,276,387 | B2 | 10/2012 | Prociw et al. | |
| 9,404,459 | B2 | 8/2016 | Mckaig et al. | |
| 10,094,342 | B2 * | 10/2018 | Johanning | F02M 31/183 |
| 10,400,676 | B2 | 9/2019 | Ribarov et al. | |
| 10,508,622 | B2 * | 12/2019 | Johanning | F02M 31/135 |

(Continued)

FOREIGN PATENT DOCUMENTS

EP    2159399 A1    3/2010

*Primary Examiner* — Alain Chau
(74) *Attorney, Agent, or Firm* — Kinney & Lange, P.A.

(57) ABSTRACT

A fuel pre-heating component in a gas turbine engine includes a component housing extending around a central axis from a first end to a second end, wherein the component housing includes walls that define an inner chamber, a heating element positioned inside the inner chamber, and a plurality of internal fuel channels disposed within the component housing and configured to be heated by the heating element.

20 Claims, 7 Drawing Sheets

(56) References Cited

U.S. PATENT DOCUMENTS

| | | | |
|---|---|---|---|
| 10,596,583 B2 | 3/2020 | Levasseur et al. | |
| 11,268,447 B2 * | 3/2022 | Freer | F02C 7/264 |
| 11,286,862 B1 | 3/2022 | Ryon et al. | |
| 11,408,351 B2 * | 8/2022 | Bousquet | F23Q 7/001 |
| 11,486,309 B2 * | 11/2022 | Ryon | F02C 7/22 |
| 11,555,450 B1 * | 1/2023 | Ryon | F02C 7/141 |
| 11,674,446 B2 * | 6/2023 | Ryon | F23R 3/283 60/39.821 |
| 11,913,646 B2 | 2/2024 | Ryon et al. | |
| 12,116,934 B2 * | 10/2024 | Binek | F23R 3/06 |
| 12,270,543 B2 * | 4/2025 | Binek | F23R 3/28 |
| 2009/0165436 A1 * | 7/2009 | Herbon | F23R 3/343 60/737 |
| 2011/0100338 A1 | 5/2011 | Vetrovec | |
| 2015/0000298 A1 * | 1/2015 | McAlister | F02C 7/16 60/39.12 |
| 2017/0260935 A1 * | 9/2017 | Johanning | F02M 31/08 |
| 2018/0016024 A1 * | 1/2018 | Stearns | B64D 27/16 |
| 2020/0080485 A1 * | 3/2020 | Bousquet | F23Q 7/00 |
| 2020/0300201 A1 * | 9/2020 | Rodriguez | F02M 31/125 |
| 2022/0136446 A1 * | 5/2022 | Ryon | F02C 9/00 60/39.827 |
| 2022/0195935 A1 * | 6/2022 | Ryon | F23R 3/28 |
| 2023/0055939 A1 * | 2/2023 | Binek | F23R 3/283 |
| 2024/0068753 A1 * | 2/2024 | Buchner | F02M 31/04 |

* cited by examiner

FUEL PREHEATING FOR FUEL INJECTION

BACKGROUND

The present disclosure relates to fuel pre-heating, and in particular to fuel pre-heating within a gas turbine engine.

Gas turbine engines inject fuel and air into combustion chambers to power the engine. Fuel properties (especially viscosity) change substantially with temperature. This can cause changes in atomization of the fuel. This is especially important for specific engine features such as ignition and altitude relight of a gas turbine engine. It is also especially important when considering atomization using pressure atomizers or discrete jet atomizers. Efficient atomization helps operate an engine and use less fuel.

SUMMARY

In one example, a fuel pre-heating component in a gas turbine engine can include a component housing extending around a central axis from a first end to a second end, wherein the component housing includes walls that define an inner chamber, a heating element positioned inside the inner chamber, and a plurality of internal fuel channels disposed within the component housing and configured to be heated by the heating element.

In another example, a system for fuel injection in a gas turbine engine can include a main combustor housing, a combustion chamber within the main combustor housing, at least one main fuel injector extending through a wall of the combustion chamber, and a fuel pre-heating component which can further include a component housing extending around a central axis from a first end to a second end, wherein the component housing includes walls that define an inner chamber, a heating element positioned inside the inner chamber, and a plurality of internal fuel channels disposed within the component.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

This disclosure presents a fuel pre-heating component and a fuel injection system designed for use in a gas turbine engine. In particular, this disclosure involves using a pre-heating component to pre-heat fuel before entering a combustion chamber.

Figure 1:
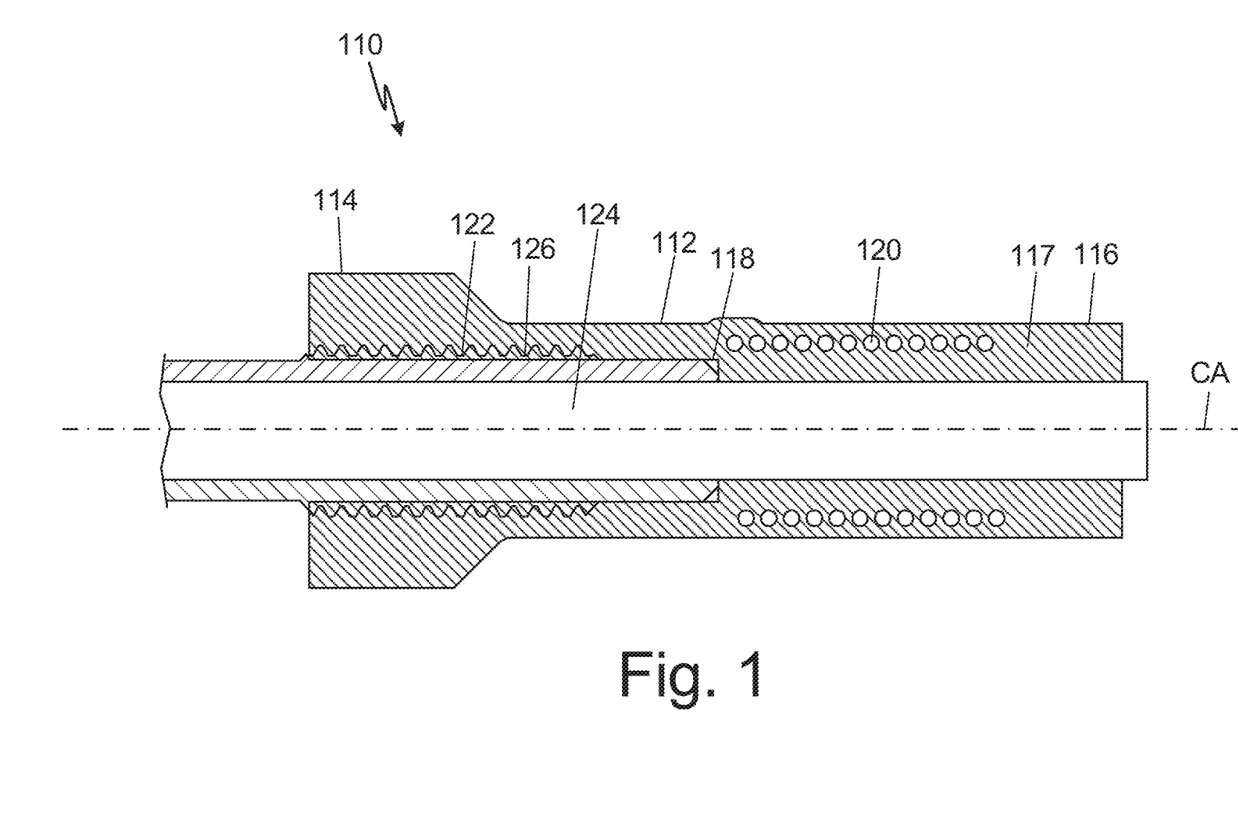
FIG. 1 is a cross-sectional view of a fuel pre-heating component with internal fuel channels.

FIG. 1 is a cross-sectional view of a fuel pre-heating component 110. Fuel pre-heating component 110 may include component housing 112 with first end 114, second end 116, and walls 117 defining inner chamber 118, inner fuel channels 120, and first threaded section 122. Pre-heating component 110 can further include heating element 124 with second threaded section 126.

As discussed above, fuel pre-heating component 110 may include component housing 112 with a first end 114, second end 116, and walls 117 which define an inner chamber 118 extending along central axis CA. Component housing 112 has inner fuel channels 120 within it, and first threaded section 122 within inner chamber 118 at first end 114. The heating element 124 is configured to be inserted into inner chamber 118 and attach to component housing 112 via second threaded section 126 of heating element 124. First threaded section 122 interfaces with second threaded section 126 to hold heating element in place. It is contemplated that other means of securing heating element 122 within component housing 112 may be used that are known in the art, such as welding or brazing. Heating element 122 can reach from first end 114 of fuel pre-heating component 110 out of second end 116 of fuel pre-heating element 110 or can span any other portion of the fuel preheating element 110 that is appropriate for a particular application. Heating element 124 can be any suitable heating device, such as an electrical resistance heating device (e.g., a glow plug) or any other heating device deemed appropriate for a particular application. In some examples, the heating element 124 can be supplemented with an ignition source such as a spark, plasma, or the tip of a glow plug as discussed further below. The ignition source can be either the surface of the glow plug already used as the preheater for the system, or alternatively a high voltage spark or plasma. Once the combustion reaction is initiated, the heat from the reaction may be able to sustain stable combustion without the need for additional input heat. The ignition source could be continuously on or activated only when needed to initiate combustion reaction.

Figure 2:
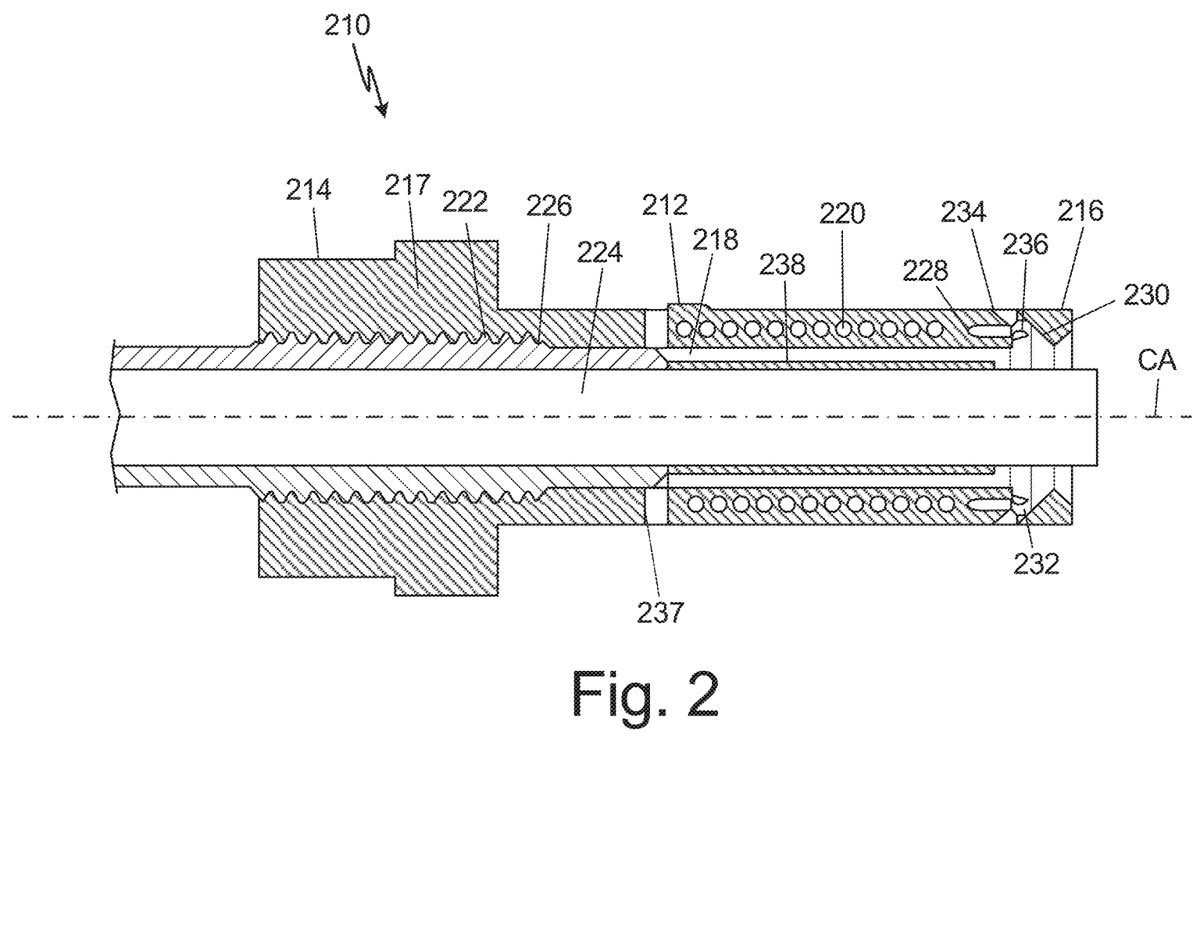
FIG. 2 is a cross-sectional view of a fuel pre-heating component with air passageways and fuel injection channels.
Figure 3:
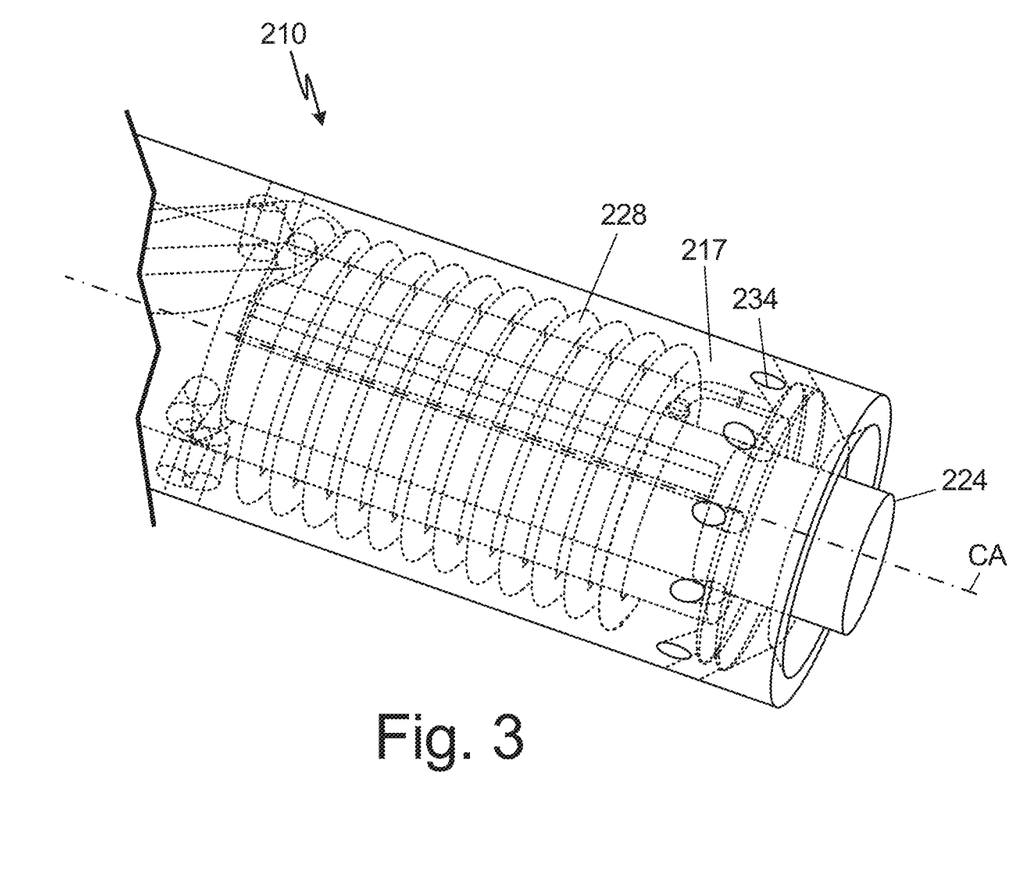
FIG. 3 is a phantom view of the fuel pre-heating component of FIG. 2.
Figure 4:
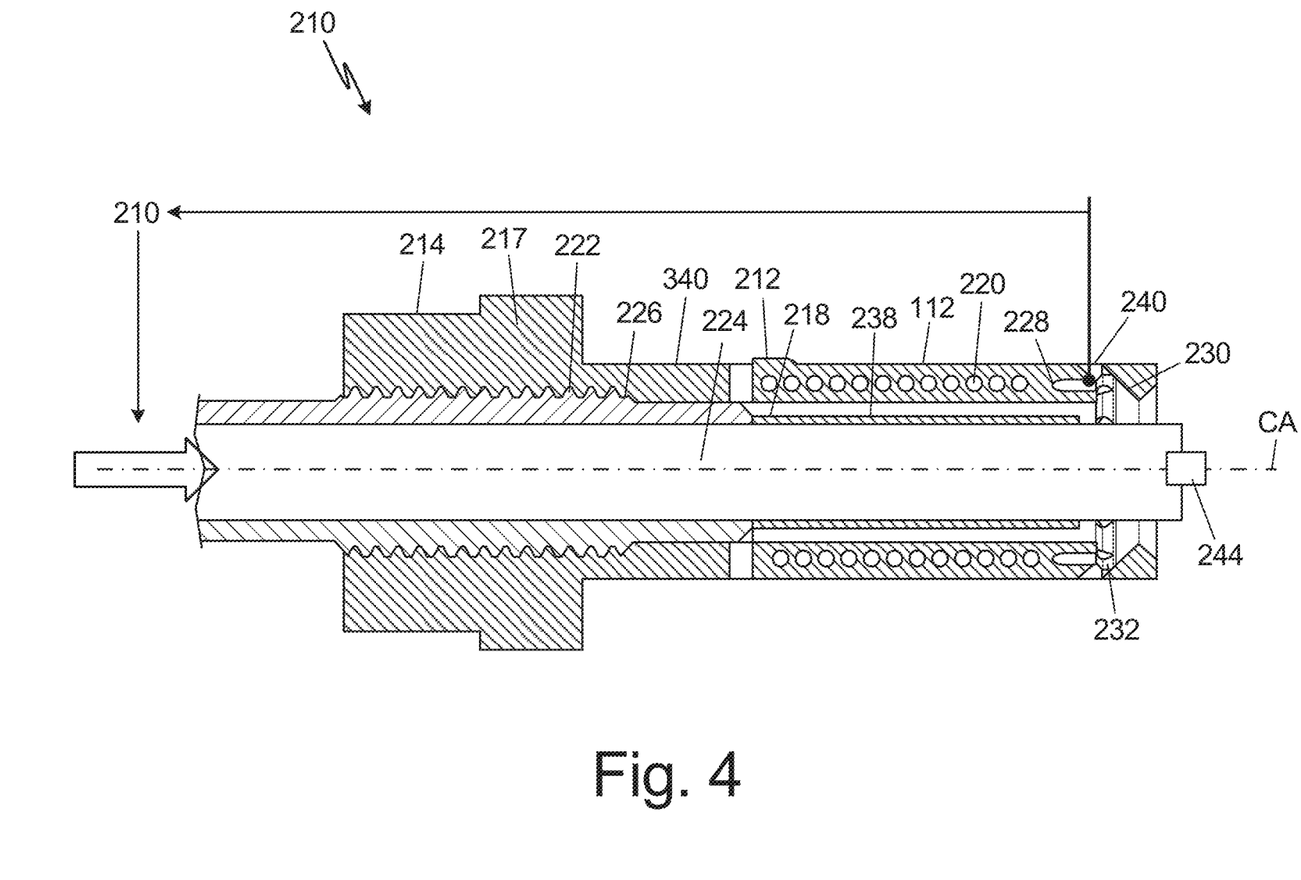
FIG. 4. is a cross-section view of the fuel pre-heating component of FIGS. 2-3 with a temperature controller.

FIG. 2 is a cross-sectional view of another exemplary embodiment of a fuel pre-heating component 210. FIG. 3 is a phantom view of the fuel pre-heating component of FIG. 2. FIG. 4. is a cross-section view of the fuel pre-heating component of FIGS. 2-3 with a temperature controller 242. FIGS. 2-4 will be discussed together.

Fuel pre-heating component 210 can include component housing 212 with first end 214, second end 216, and walls 217 defining inner chamber 218, inner fuel channels 220, and first threaded section 222. Pre-heating component 210 can further include heating element 224 with second threaded section 226, fuel injection channels 228, splash plates 230, fuel openings 232, first air passageways 234, air entrances 236, upstream air entrances 237, and second air passageways 238. Pre-heating component 210 can further include fuel temperature sensor 240 with temperature controller 242, and ignition sources 244 (as shown in FIG. 4).

As discussed above, fuel pre-heating component 210 may include component housing 212 with a first end 214, second end 216, and walls 217 which define an inner chamber 218 extending along central axis CA. Component housing 212 has inner fuel channels 220 within it, and first threaded section 222 within inner chamber 218 at first end 214. The heating element 224 is configured to insert into inner chamber 218 and attach to component housing 212 via second threaded section 226 of heating element 224. First threaded section 222 interfaces with second threaded section 226 to hold heating element 224 in place. Fuel injection channels 228 extend through component housing 212 and enter inner chamber 218 at second end 216 of fuel pre-heating component 210 through fuel openings 232. Fuel openings 232 can directly oppose splash plates 230 at second end 216 to direct fuel radially into inner chamber 218 and towards heating element 224. The fuel openings 232 can be configured to atomize fuel that impinges on the splash plates 230 after exiting the fuel openings 232. In some examples, another form of atomization, such as pressure atomizers or discrete jet atomizers can be used in addition to or in place of the splash plates 230 and fuel openings 232.

FIGS. 2-4 further include first air passageways 234 which inject air or other fluid through air entrances 236 into inner chamber 218 at second end 216 of fuel pre-heating component. In the illustrated embodiments, air openings 236 inject air parallel to splash plates 230, but it is contemplated that the angle of air injection can vary depending on desired mixing. It is also contemplated that upstream air entrances 237 can be disposed between first end 214 and inner fuel channels 220 (shown in FIG. 2). Second air passageways 238 run parallel to central axis CA to second end 216 and inject air at the same angle as fuel openings 232 in the illustrated embodiments. In some examples, this angle can be selected to provide flow characteristics appropriate for a particular application. Second air passageways 238 help provide a buffer between heating element 224 and fuel channels 220,228. In FIG. 3, fuel channels 220 are positioned helically around inner chamber 218, helping to increase surface area for heat transfer between heating element 224 and fuel within fuel channels 220. It is contemplated that fuel channels 220 can be wrapped helically around the central axis in a single plane, or in multiple layers within walls 217 in layers tunnels extending radially outward from the central axis. In other examples, the fuel channels 220 can be positioned differently around inner chamber 218 as long as the desired heat transfer between heating element 224 and fuel within fuel channels 220 occur. In some examples, the helical channels (or channels with a different configuration) may also include air channels to preheat air for applications within a gas turbine engine. FIG. 4 depicts fuel temperature sensor 240 positioned at fuel opening 232 to monitor fuel temperature. The temperature of the fuel can be transmitted from fuel temperature sensor 240 to temperature controller 210, which can vary power sent to heating element 224 to either increase or decrease the fuel temperature at fuel openings 232 to avoid coking of fuel flowing through the fuel channels 220,228. In one example, temperature controller 210 can be configured to provide lower power to heating element 224 during a fuel preheating cycle and higher power during a fuel ignition cycle. For example, during a fuel preheating cycle it may be desirable to maintain fuel flowing through the fuel channel 228 at a temperature of 100° F. to 200° F. During a fuel ignition cycle it may be desirable to maintain fuel flowing through the fuel channel 228 at a temperature of 200° F. to 250° F. or more, depending on the coking propensity of the fuel being used.

Figure 5:
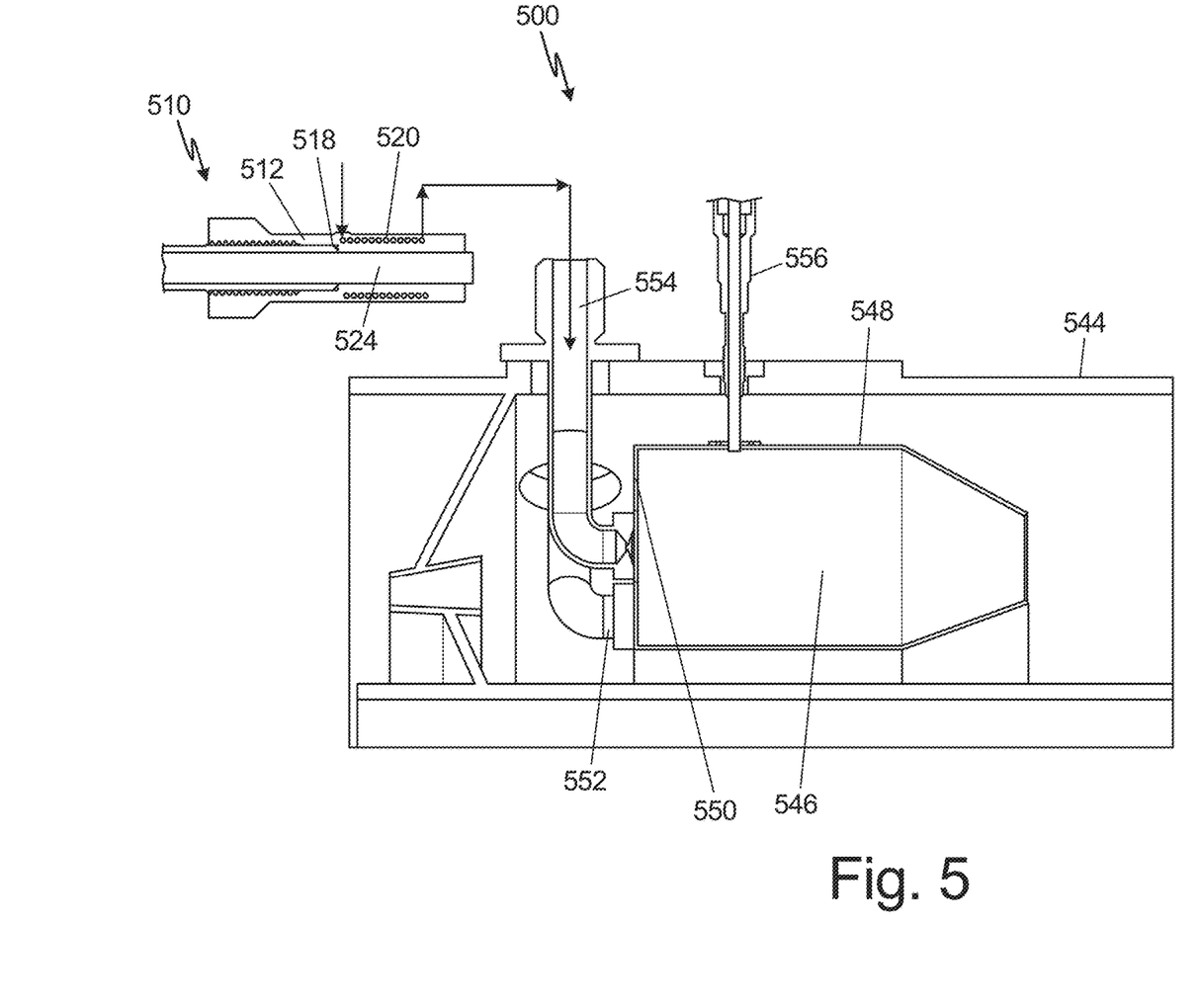
FIG. 5 is a cross-sectional view of a fuel pre-heating component within a system for fuel injection in a gas turbine engine.
Figure 6:
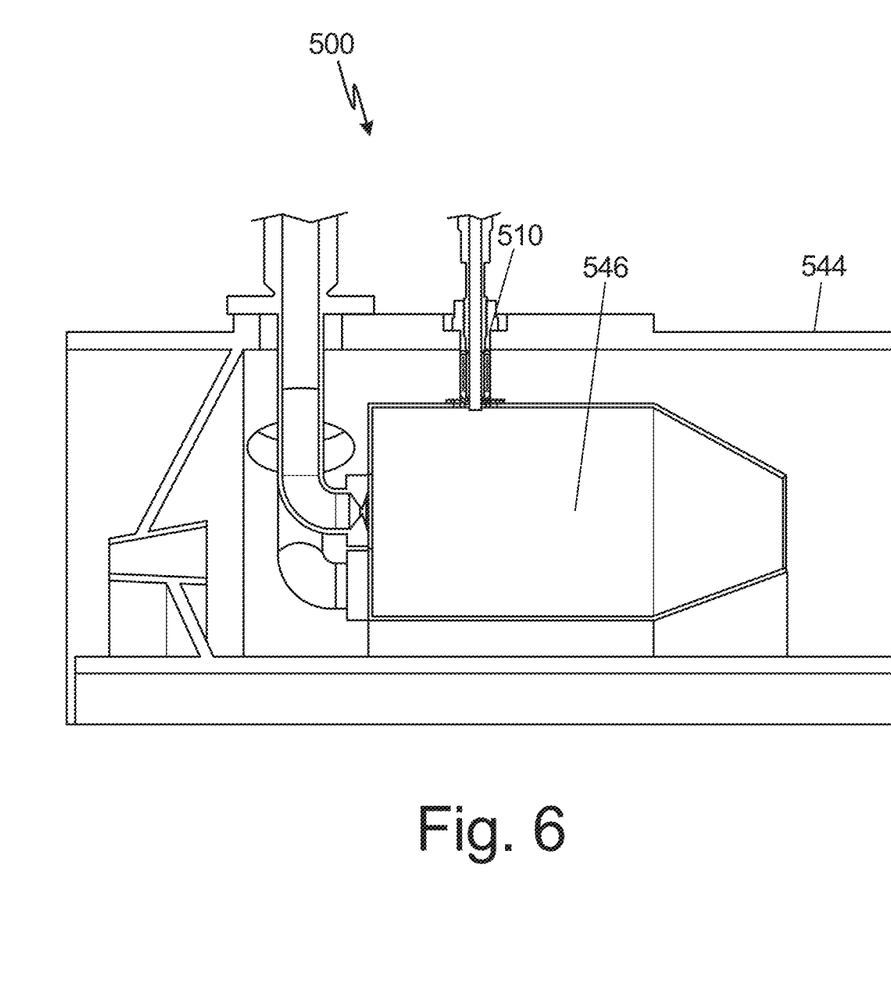
FIG. 6 is a cross-sectional view of a fuel pre-heating component mounted through a combustion chamber wall in a system for fuel injection in a gas turbine engine.
Figure 7:
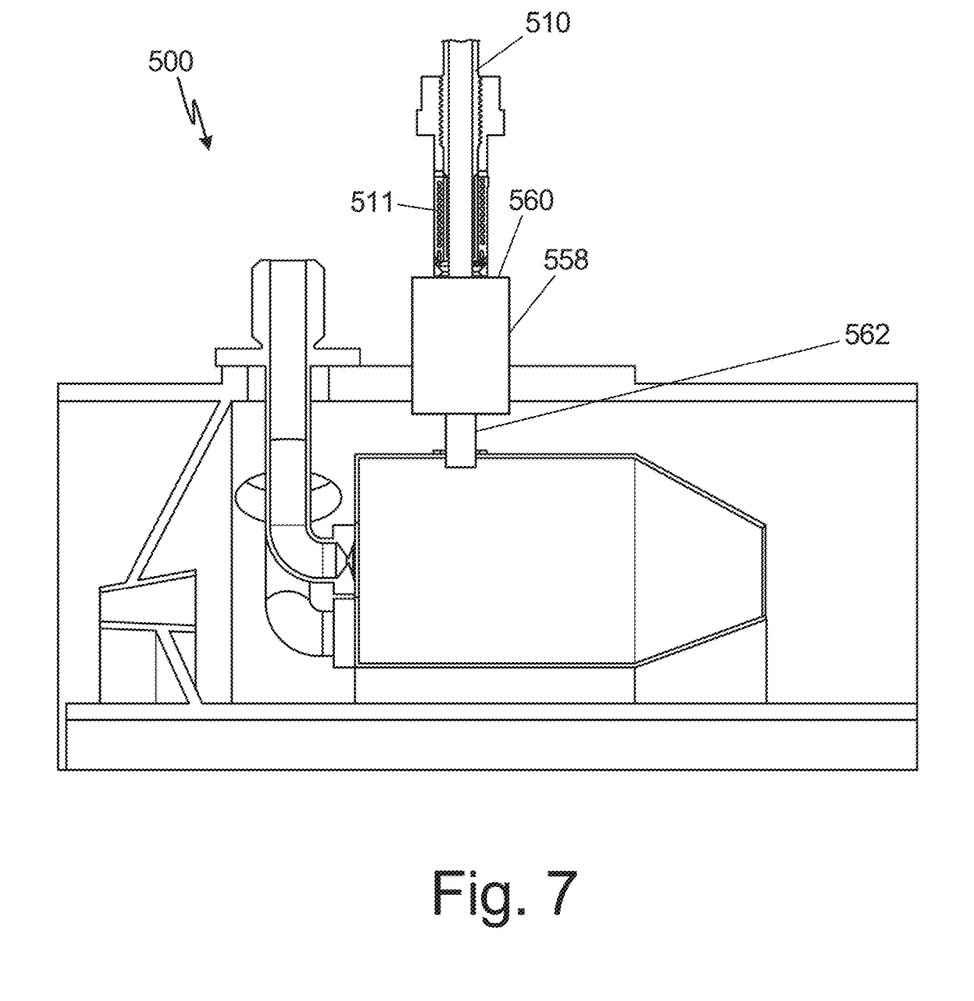
FIG. 7 is a cross-sectional view of a fuel pre-heating component mounted on a torch combustor within a system for fuel injection in a gas turbine engine.

FIG. 5 is a cross-sectional view of a fuel pre-heating component within a system for fuel injection in a gas turbine engine. FIG. 6 is a cross-sectional view of a fuel pre-heating component mounted through a combustion chamber wall in a system for fuel injection in a gas turbine engine. FIG. 7 is a cross-sectional view of a fuel pre-heating component mounted on a torch combustor within a system for fuel injection in a gas turbine engine. FIGS. 5-7 will be discussed together.

The system 500 for fuel injection can include fuel pre-heating component 510 can include component housing 512 with first end 514 and second end 516 defining inner chamber 518, and inner fuel channels 520. Pre-heating component 510 can further include heating element 524. The system can further include main combustor housing 544, combustion chamber 546 with walls 548 and back wall 550, main fuel injector 552, and main fuel passage 554. The system can further include ignition source 556 (FIG. 5) or torch combustor 558 (FIG. 7).

Main combustor housing 544 can contain combustion chamber 546. Combustion chamber 546 has liner walls 548 and back wall 550. Main fuel injector 552 can include main fuel passage 554 which extends through main combustor housing 544 and connects main fuel injector 552 to combustion chamber 546 at back wall 550. It is contemplated that more than one main fuel injector may be used, and that ignition source 556 can be mounted in top wall 548 of combustion chamber 546 (depicted in FIG. 5) or any other suitable location.

Fuel pre-heating component 510 can be located elsewhere within the gas turbine engine, as depicted in FIG. 5, or through main combustor housing 544 into the walls of the combustion chamber 546 (depicted in FIG. 6). Fuel pre-heating component 510 can also be located outside of main combustor housing 544 and attached at second end 516 to torch combustor 558 via first end 560 (depicted in FIG. 7). Torch combustor can extend through main combustor housing 544 and attach to combustion chamber 546 through the liner wall 548 via second end 562 of torch combustor.

Using a fuel pre-heating component has several advantages over traditional gas turbine combustion systems. A consistently atomized fuel can lead to much more controllable starts. Pre-heating reduces the need for specialized 'pilot' or 'starting' fuel injectors, and further reduces the need for cold-fuel testing requirements of fuel injectors. This results in cleaner burning fuel with less coking within the combustion chamber. Preheating the fuel decreases the time to evaporation, helping to ensure more complete combustion, including fully consuming particulate matter (soot) created in the conversion of hydrocarbons to combustion productions.

DISCUSSION OF POSSIBLE EMBODIMENTS

The following are non-exclusive descriptions of possible embodiments of the present invention.

A fuel pre-heating component in a gas turbine engine can include a component housing extending around a central axis from a first end to a second end, wherein the component housing includes walls that define an inner chamber, a heating element positioned inside the inner chamber, and a plurality of internal fuel channels disposed within the component housing and configured to be heated by the heating element.

The fuel pre-heating component of the preceding paragraph can optionally include, additionally and/or alternatively, any one or more of the following features, configurations and/or additional components:

The component can include a first threaded section within the inner chamber, and a second threaded section on a first end of the heating element, where the first threaded section and second threaded section are configured to connect the heating element to the component housing.

The heating element can be an electrical resistance heating element.

The component can further include an ignition source within the inner chamber.

The plurality of internal fuel channels can be disposed helically around the central axis and the heating element.

The component can further include a plurality of internal air channels disposed helically around the central axis and the heating element, wherein the internal air channels are configured to preheat air.

The plurality of internal fuel channels can include multiple layers of fuel channels arranged radially outward from the central axis within the walls that define the inner chamber.

The component can further include a plurality of fuel injection channels in the second end of the component housing, and a plurality of splash plates directly opposing a plurality of fuel openings of the plurality of fuel injection channels into the inner chamber, wherein the splash spates are configured to atomize fuel impinging on the splash plates.

The component can further include at least one fuel temperature sensor at the entrance to at least one of the plurality of fuel injection channels, and a temperature controller connected to the at least one fuel temperature sensor and configured to vary power to the heating element to control the temperature of fuel in the plurality of fuel injection channels when the fuel pre-heating component is in operation.

The component can further include a torch combustor attached to the second end of the fuel pre-heating component and configured to contain gases from ignited fuel.

The fuel pre-heating component may have the plurality of splash plates acutely angled with respect to the central axis to direct fuel from the plurality of fuel openings radially inward in the inner chamber.

The component can further include a first plurality of air passageways in the component housing with a plurality of air entrances into the inner chamber, wherein each air entrance is parallel to a corresponding splash plate.

The component can further include a second plurality of air passageways between the component housing and the heating element, wherein the second plurality of air passageways are parallel to the central axis.

In another example embodiment, a system for fuel injection in a gas turbine engine can include a main combustor housing, a combustion chamber within the main combustor housing, at least one main fuel injector extending through a wall of the combustion chamber, and a fuel pre-heating component which can further include a component housing extending around a central axis from a first end to a second end, wherein the component housing includes walls that define an inner chamber, a heating element positioned inside the inner chamber, and a plurality of internal fuel channels disposed within the component.

The fuel pre-heating system of the preceding paragraph can optionally include, additionally and/or alternatively, any one or more of the following features, configurations and/or additional components:

The fuel from the plurality of internal fuel channels can be fed into a main fuel passage configured to feed fuel to the at least one main fuel injector.

The fuel pre-heating component of the system cam ne mounted through the wall of the combustion chamber, and further include a plurality of fuel injection channels in the second end of the component housing, a plurality of splash plates directly opposing a plurality of fuel openings of the plurality of fuel injection channels into the inner chamber, wherein the splash spates are configured to atomize fuel impinging on the splash plates, a first plurality of air passageways in the component housing with a plurality of air entrances into the inner chamber, a second plurality of air passageways between the component housing and the heating element, and an ignition source within the inner chamber, wherein fuel from the plurality of fuel openings can be ignited by the ignition sources and injected into combustion chamber.

The fuel pre-heating component of the system can be mounted on a top wall of the combustion chamber, and at least one main fuel injector can be mounted on a back wall of the combustion chamber.

The system can further include a torch combustor attached at a first end of the torch combustor to the second end of the fuel pre-heating component, and attached at a second end of the torch combustor to the wall of the combustion chamber.

The system can further include a plurality of fuel injection channels in the second end of the component housing, a plurality of fuel openings of the plurality of fuel injection channels into the inner chamber, and an ignition source within the inner chamber configured to ignite fuel in the inner chamber and provide combustion gases to the torch combustor.

The torch combustor of the system can be mounted on a top wall of the combustion chamber, and at least one main fuel injector can be mounted on a back wall of the combustion chamber.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel pre-heating component in a gas turbine engine, the fuel pre-heating component comprising:
   a component housing extending around a central axis from a first end to a second end, wherein the component housing includes walls that define an inner chamber;
   a heating element positioned inside the inner chamber;
   a plurality of fuel injection channels in the second end of the component housing;
   a plurality of splash plates directly opposing a plurality of fuel openings of the plurality of fuel injection channels into the inner chamber, wherein the splash spates are configured to atomize fuel impinging on the splash plates; and
   a plurality of internal fuel channels disposed within the component housing and configured to be heated by the heating element.

2. The fuel pre-heating component of claim 1, further comprising:
 a first threaded section within the inner chamber; and
 a second threaded section on a first end of the heating element, where the first threaded section and second threaded section are configured to connect the heating element to the component housing.

3. The fuel pre-heating component of claim 1, wherein the heating element is an electrical resistance heating element.

4. The fuel pre-heating component of claim 1, further comprising an ignition source within the inner chamber.

5. The fuel pre-heating component of claim 1, wherein the plurality of internal fuel channels are disposed helically around the central axis and the heating element.

6. The fuel pre-heating component of claim 5, further comprising a plurality of internal air channels disposed helically around the central axis and the heating element, wherein the internal air channels are configured to preheat air.

7. The fuel pre-heating component of claim 1, further comprising:
 at least one fuel temperature sensor at the entrance to at least one of the plurality of fuel injection channels; and
 a temperature controller connected to the at least one fuel temperature sensor and configured to vary power to the heating element to control the temperature of fuel in the plurality of fuel injection channels when the fuel pre-heating component is in operation.

8. The fuel pre-heating component of claim 1, further comprising a torch combustor attached to the second end of the fuel pre-heating component and configured to contain gases from ignited fuel.

9. The fuel pre-heating component of claim 1, wherein the plurality of splash plates are acutely angled with respect to the central axis to direct fuel from the plurality of fuel openings radially inward in the inner chamber.

10. The fuel pre-heating component of claim 9, further comprising:
 a first plurality of air passageways in the component housing with a plurality of air entrances into the inner chamber, wherein each air entrance is parallel to a corresponding splash plate.

11. The fuel pre-heating component of claim 10, further comprising:
 a second plurality of air passageways between the component housing and the heating element, wherein the second plurality of air passageways are parallel to the central axis.

12. A system for fuel injection in a gas turbine engine, the system comprising:
 a main combustor housing;
 a combustion chamber within the main combustor housing;
 at least one main fuel injector extending through a wall of the combustion chamber;
 a fuel pre-heating component further comprising:
  a component housing extending around a central axis from a first end to a second end, wherein the component housing includes walls that define an inner chamber;
  a heating element positioned inside the inner chamber; and
  a plurality of internal fuel channels disposed within the component housing and configured to be heated by the heating element;
  a plurality of fuel injection channels in the second end of the component housing;
  a plurality of fuel openings of the plurality of fuel injection channels into the inner chamber; and
  an ignition source within the inner chamber configured to ignite fuel in the inner chamber and provide combustion gases to the torch combustor.

13. The system of claim 12, wherein fuel from the plurality of internal fuel channels is fed into a main fuel passage configured to feed fuel to the at least one main fuel injector.

14. The system of claim 12, wherein the fuel pre-heating component is mounted through the wall of the combustion chamber, and further comprising:
 a plurality of fuel injection channels in the second end of the component housing;
 a plurality of splash plates directly opposing a plurality of fuel openings of the plurality of fuel injection channels into the inner chamber, wherein the splash plates are configured to atomize fuel impinging on the splash plates;
 a first plurality of air passageways in the component housing with a plurality of air entrances into the inner chamber;
 a second plurality of air passageways between the component housing and the heating element; and
 an ignition source within the inner chamber;
 wherein fuel from the plurality of fuel openings is ignited by the ignition sources and injected into combustion chamber.

15. The system of claim 14, wherein the fuel pre-heating component is mounted on a top wall of the combustion chamber, and at least one main fuel injector is mounted on a back wall of the combustion chamber.

16. The system of claim 12, further comprising:
 a torch combustor attached at a first end of the torch combustor to the second end of the fuel pre-heating component, and attached at a second end of the torch combustor to the wall of the combustion chamber.

17. The system of claim 16, wherein the torch combustor is mounted on a top wall of the combustion chamber, and at least one main fuel injector is mounted on a back wall of the combustion chamber.

18. A system for fuel injection in a gas turbine engine, the system comprising:
 a main combustor housing;
 a combustion chamber within the main combustor housing;
 at least one main fuel injector extending through a wall of the combustion chamber;
 a fuel pre-heating component further comprising:
  a component housing extending around a central axis from a first end to a second end, wherein the component housing includes walls that define an inner chamber;
  a heating element positioned inside the inner chamber; and
  a plurality of internal fuel channels disposed within the component housing and configured to be heated by the heating element,
 a torch combustor attached at a first end of the torch combustor to the second end of the fuel pre-heating component, and attached at a second end of the torch combustor to the wall of the combustion chamber, wherein the torch combustor is mounted on a top wall of the combustion chamber, and at least one main fuel injector is mounted on a back wall of the combustion chamber.

19. The system of claim 18, wherein the fuel pre-heating component is mounted through the wall of the combustion chamber, and further comprising:
- a plurality of fuel injection channels in the second end of the component housing; and
- a plurality of splash plates directly opposing a plurality of fuel openings of the plurality of fuel injection channels into the inner chamber, wherein the splash plates are configured to atomize fuel impinging on the splash plates.

20. The system of claim 19, further comprising:
- a first plurality of air passageways in the component housing with a plurality of air entrances into the inner chamber;
- a second plurality of air passageways between the component housing and the heating element; and
- an ignition source within the inner chamber;
- wherein fuel from the plurality of fuel openings is ignited by the ignition sources and injected into combustion chamber.

* * * * *